(12) United States Patent
Bansal et al.

(10) Patent No.: US 11,829,338 B2
(45) Date of Patent: Nov. 28, 2023

(54) UNLABELED LOG ANOMALY CONTINUOUS LEARNING

(71) Applicant: International Business Machines Corporation, Armonk, NY (US)

(72) Inventors: Sahil Bansal, Kurukshetra (IN); Harshit Kumar, Delhi (IN); Lu An, Raleigh, NC (US); Xiaotong Liu, San Jose, CA (US); Anbang Xu, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 77 days.

(21) Appl. No.: 17/457,922

(22) Filed: Dec. 7, 2021

(65) Prior Publication Data
US 2023/0177027 A1    Jun. 8, 2023

(51) Int. Cl.
*G06F 16/215*    (2019.01)

(52) U.S. Cl.
CPC .................. *G06F 16/215* (2019.01)

(58) Field of Classification Search
CPC ..................................... G06F 16/215
USPC ....................................... 707/690
See application file for complete search history.

(56) References Cited

U.S. PATENT DOCUMENTS

| | | |
|---|---|---|
| 8,495,429 B2 | 7/2013 | Fu |
| 9,361,463 B2 | 6/2016 | Ferragut |
| 11,055,631 B2 | 7/2021 | Zhang |
| 11,243,834 B1 * | 2/2022 | Mandal ................. G06F 11/079 |
| 2018/0357214 A1 * | 12/2018 | Ajiro ....................... G06F 18/23 |
| 2019/0354457 A1 * | 11/2019 | Urmanov ............... G06F 16/353 |

(Continued)

FOREIGN PATENT DOCUMENTS

| | | |
|---|---|---|
| EP | 2953298 B1 | 3/2018 |
| KR | 20210011822 A | 2/2021 |

OTHER PUBLICATIONS

"IBM Cloud Pak for Watson AIOps 3.1 helps SREs and IT teams to maintain a high availability of applications and helps remediate and resolve incidents through automation", IBM Canada Software Announcement, Grace Period Disclosure, A21-0164, dated Apr. 27, 2021, 8 pages, <https://www.ibm.com/common/ssi/ShowDoc.wss?docURL=/common/ssi/rep_ca/4/649/ENUSA21-0164/index.html>.

(Continued)

*Primary Examiner* — Cam Linh T Nguyen
(74) *Attorney, Agent, or Firm* — Randy Tejeda (57) ABSTRACT

One or more computer processors classify each log line in a plurality of unlabeled log lines as an erroneous log line or a non-erroneous log line. The one or more computer processors templatize each classified erroneous log line and non-erroneous log line in the plurality of unlabeled log lines. The one or more computer processors cluster erroneous log templates into erroneous log template clusters and the non-erroneous log templates into non-erroneous log template clusters. The one or more computer processors eliminate the erroneous log template clusters and the non-erroneous log template clusters that exceed a frequency threshold. The one or more computer processors train a log anomaly model utilizing=remaining erroneous log template clusters and remaining non-erroneous log template clusters. The one or more computer processors identify a subsequent log line as anomalous or non-anomalous utilizing the trained log anomaly model.

20 Claims, 9 Drawing Sheets

(56) References Cited

U.S. PATENT DOCUMENTS

| | | | |
|---|---|---|---|
| 2019/0370347 A1* | 12/2019 | Levy | G06F 16/355 |
| 2020/0021511 A1* | 1/2020 | Xu | H04L 41/145 |
| 2020/0067948 A1 | 2/2020 | Baradaran | |
| 2020/0160230 A1* | 5/2020 | Wang | G06N 5/025 |
| 2021/0064500 A1* | 3/2021 | Przestrzelski | G06F 11/079 |
| 2021/0232483 A1* | 7/2021 | Togawa | G06F 11/0751 |
| 2022/0036154 A1* | 2/2022 | Yeddu | G06N 3/044 |
| 2022/0123988 A1* | 4/2022 | Tora | H04L 41/069 |

OTHER PUBLICATIONS

Disclosed Anonymously, "A Method and System for Log Classification with Expert Knowledge in Cloud Microservices", An IP.com Prior Art Database Technical Disclosure, IP.com No. IPCOM000266453D, IP.com Electronic Publication Date: Jul. 15, 2021, 6 pages.

Disclosed Anonymously, "Learning Values to Determine if Sufficient Data is Available to Create ADE Models", An IP.com Prior Art Database Technical Disclosure, IP.com No. IPCOM000246060D, IP.com Electronic Publication Date: Apr. 29, 2016, 3 pages.

Du et al., "DeepLog: Anomaly Detection and Diagnosis from System Logs through Deep Learning", CCS'17, Oct. 30-Nov. 3, 2017, 14 pages.

Farzad et al., "Unsupervised log message anomaly detection", Available online Jul. 2, 2020, 9 pages, <https://www.sciencedirect.com/science/article/pii/S2405959520300643?via%3Dihub>.

Fu et al., "Execution Anomaly Detection in Distributed Systems through Unstructured Log Analysis", 2009 Ninth IEEE International Conference on Data Mining, DOI10.1109/ICDM2009.60, 10 pages.

Henriques et al., "Combining K-Means and XGBoost Models for Anomaly Detection Using Log Datasets", Published: Jul. 17, 2020, 16 pages.

Khatuya et al., "ADELE: Anomaly Detection from Event Log Empiricism", IEEE INFOCOM 2018—IEEE Conference on Computer Communications, 9 pages.

Landauer et al., "Dynamic log file analysis: An unsupervised cluster evolution approach for anomaly detection", Available online Sep. 4, 2018, 23 pages, <https://www.sciencedirect.com/science/article/pii/S0167404818306333?via%3Dihub>.

Tak et al., "Priolog: Mining Important Logs via Temporal Analysis and Prioritization", Published: Nov. 9, 2019, 17 pages, <https://www.mdpi.com/2071-1050/11/22/6306>.

Vaarandi et al., "LogCluster—A Data Clustering and Pattern Mining Algorithm for Event Logs", Oct. 3-3, 2003, 7 pages, <https://ieeexplore.ieee.org/document/1251233>.

Bansal et al., "Log Anomaly Detection", U.S. Appl. No. 17/457,924, filed Dec. 7, 2021, 28 pages.

Appendix P—List of IBM Patents or Patent Applications Treated as Related, Filed herewith, 2 Pages.

\* cited by examiner

| Lexical similarity threshold | Lexical similarity threshold | #anomalous template clusters/Total #template clusters |
|---|---|---|
| 0.6 | Medium | 24/58 (41.4%) |
| 0.6 | 3rd Quantile | 35/58 (60.3%) |
| 0.7 | Medium | 35/74 (47.3%) |
| 0.7 | 3rd Quantile | 47/74 (63.5%) |

FIG. 3A

| Experimental Scenario | norm_0.csv | | | norm_1.csv | | | norm_2.csv | | | norm_3.csv | | | norm_4.csv | | | norm_5.csv | | |
|---|---|---|---|---|---|---|---|---|---|---|---|---|---|---|---|---|---|---|
| | #L | #E | #A | #L | #E | #A | #L | #E | #A | #L | #E | #A | #L | #E | #A | #L | #E | #A |
| 0.6, Median | 192 | 15 | 0 | 188 | 14 | 0 | 201 | 25 | 0 | 228 | 27 | 0 | 28 | 2 | 0 | 28 | 4 | 0 |
| 0.6, 3rd Quantile | | | 0 | | | 0 | | | 0 | | | 0 | | | 0 | | | 0 |
| 0.7, Median | | | 0 | | | 0 | | | 0 | | | 0 | | | 0 | | | 0 |
| 0.7, 3rd Quantile | | | 0 | | | 0 | | | 0 | | | 0 | | | 0 | | | 0 |

FIG. 3B

| Experimental Scenario | inc_0.csv | | | inc_1.csv | | | inc_2.csv | | | inc_3.csv | | | inc_4.csv | | | inc_5.csv | | |
|---|---|---|---|---|---|---|---|---|---|---|---|---|---|---|---|---|---|---|
| | #L | #E | #A | #L | #E | #A | #L | #E | #A | #L | #E | #A | #L | #E | #A | #L | #E | #A |
| 0.6, Median | 22 | 6 | 0 | 33 | 28 | 2 | 38 | 36 | 0 | 1148 | 56 | 7 | 628 | 50 | 7 | 24 | 0 | 0 |
| 0.6, 3rd Quantile | | | 0 | | | 2 | | | 0 | | | 15 | | | 12 | | | 0 |
| 0.7, Median | | | 0 | | | 0 | | | 0 | | | 8 | | | 8 | | | 0 |
| 0.7, 3rd Quantile | | | 0 | | | 2 | | | 0 | | | 15 | | | 13 | | | 0 |

FIG. 3C

| Experimental Scenario | Confusion Matrix | | | | Accuracy |
|---|---|---|---|---|---|
| | TP | FN | FP | TN | |
| 0.6, Median | 3 | 3 | 0 | 6 | 75% |
| 0.6, 3rd, Quantile | 3 | 3 | 0 | 6 | 75% |
| 0.7, Median | 2 | 4 | 0 | 6 | 67% |
| 0.7, 3rd, Quantile | 3 | 3 | 0 | 6 | 75% |

| #Training LL | #Erroneous LL | #Non-erroneous LL | #Erroneous LTC | #Non-erroneous LTC | #Anomalous ELTC | #Anomalous non-ELTC |
|---|---|---|---|---|---|---|
| 41,96,339 | 11,70,029 | 30,26,310 | 29 | 73 | 16 | 18 |

| #Testing LL | #Erroneous LL | #Non-erroneous LL | #Anomalous ELL | #Anomalous non-ELL |
|---|---|---|---|---|
| 3,826 | 1278 | 2548 | 0 | 0 |

| #Testing LL | #Erroneous LL | #Non-erroneous LL | #Anomalous ELL | #Anomalous non-ELL |
|---|---|---|---|---|
| 8,733 | 1404 | 7329 | 0 | 0 |

FIG. 5A

| #Training LL | #Erroneous LL | #Non-erroneous LL | #Erroneous LTC | #Non-erroneous LTC | #Anomalous ELTC | #Anomalous non-ELTC |
|---|---|---|---|---|---|---|
| 2,84,775 | 9823 | 2,74,952 | 28 | 26 | 17 | 5 |

| #Testing LL | #Erroneous LL | #Non-erroneous LL | #Anomalous ELL | #Anomalous non-ELL |
|---|---|---|---|---|
| 274 | 6 | 268 | 0+1 | 0 |

| #Testing LL | #Erroneous LL | #Non-erroneous LL | #Anomalous ELL | #Anomalous non-ELL |
|---|---|---|---|---|
| 2596 | 1810 | 786 | 1007+742 | 1 |

UNLABELED LOG ANOMALY CONTINUOUS LEARNING

The following disclosure(s) are submitted under 35 U.S.C. 102(b)(1)(A):

IBM Canada Software Announcement: IBM Cloud Pak for Watson AIOps 3.1 helps SREs and IT teams to maintain a high availability of applications and helps remediate and resolve incidents through automation; Sahil Bansal, Harshit Kumar, Lu An, Xiaotong Liu, and Anbang Xu; Mar. 18, 2021.

BACKGROUND

The present invention relates generally to the field of machine learning, and more particularly to continuous learning of point-in-time log anomalies from unlabeled data.

Machine learning (ML) is the scientific study of algorithms and statistical models that computer systems use to perform a specific task without using explicit instructions, relying on patterns and inference instead. Machine learning is seen as a subset of artificial intelligence. Machine learning algorithms build a mathematical model based on sample data, known as training data, in order to make predictions or decisions without being explicitly programmed to perform the task. Machine learning algorithms are used in a wide variety of applications, such as email filtering and computer vision, where it is difficult or infeasible to develop a conventional algorithm for effectively performing the task.

Anomaly detection is the identification of rare items, events or observations which raise suspicions by differing significantly from the majority of the data. Typically, the anomalous items will translate to some kind of problem such as bank fraud, a structural defect, medical problems or errors in a text. Anomalies are also referred to as outliers, novelties, noise, deviations, and exceptions.

SUMMARY

Embodiments of the present invention disclose a computer-implemented method, a computer program product, and a system. The computer-implemented method includes one or more computer processers classifying each log line in a plurality of unlabeled log lines as an erroneous log line or a non-erroneous log line. The one or more computer processors templatize each classified erroneous log line and non-erroneous log line in the plurality of unlabeled log lines. The one or more computer processors cluster erroneous log templates into erroneous log template clusters and the non-erroneous log templates into non-erroneous log template clusters. The one or more computer processors eliminate the erroneous log template clusters and the non-erroneous log template clusters that exceed a frequency threshold. The one or more computer processors train a log anomaly model utilizing remaining erroneous log template clusters and remaining non-erroneous log template clusters. The one or more computer processors identify a subsequent log line as anomalous or non-anomalous utilizing the trained log anomaly model.

BRIEF DESCRIPTION OF THE DRAWINGS

Figure (i.e., FIG. 1 is a functional block diagram illustrating a computational environment, in accordance with an embodiment of the present invention.

DETAILED DESCRIPTION

Artificial intelligence in information technology operations (AIOps) has an essential role in modern, data driven organizations and operations. AIOps utilize big data to aggregate siloed information technology operations data allowing efficient digital transformation (e.g., multiple environments, virtualized resources, dynamic infrastructure), cloud migration, and developmental operations (e.g., provisioning and reconfiguring infrastructure). Anomaly pipelines play a key role within AIOps, where anomaly pipelines detect data anomalies within an AIOps data pipeline. Anomaly pipelines monitor integrated systems and components within an AIOps system, collect information associated with detected anomalies, and utilize the collected information to mitigate the anomaly, such as fault localization supporting root cause analysis. Anomaly pipelines underpin many AIOps systems, thus highly accurate anomaly detection is a requirement for efficient and effective AIOps. For example, false positives in anomaly detection streams errors to the rest of the pipeline causing a reduction in operational efficiency and increased computational wastage. Currently, modern anomaly pipelines require substantial amounts of log data (i.e., training data) corresponding to a healthy state of monitored system, data pipeline, or component. These modern anomaly pipelines are particularly inefficient and ineffective in "0-day" scenarios as the pipeline is initially deployed and training data is scarce. Obtaining the required training data can be prohibitively expensive for many organizations due to the state of monitored system (e.g., mixture of healthy and unhealthy logs). Anomaly pipelines trained with ineffective training data produce increased levels of false positives. There is an increasing need for an anomaly detection system that efficiently detects point-in-time anomalies in initial deployment situations (i.e., "0-day").

Embodiments of the present invention provide a system to detect point-in-time anomalies in initial deployment situations with a reduction in false positives. Embodiments of the present invention improve newly deployed log anomaly detection systems through incremental system updates using clustering of templatized log lines to identify novel log lines. Embodiments of the present invention reduce the number of false positives in an initial anomaly detection deployment. Embodiments of the present invention reduce the required amount of training data (i.e., logs) for an effective anomaly detection system. Embodiments of the present invention correlate anomalous events with other event data across environments to identify the cause of an outage or performance problem and suggest or implement remedies. Implementation of embodiments of the invention may take a variety of forms, and exemplary implementation details are discussed subsequently with reference to the Figures.

The present invention will now be described in detail with reference to the Figures.

Figure 1:
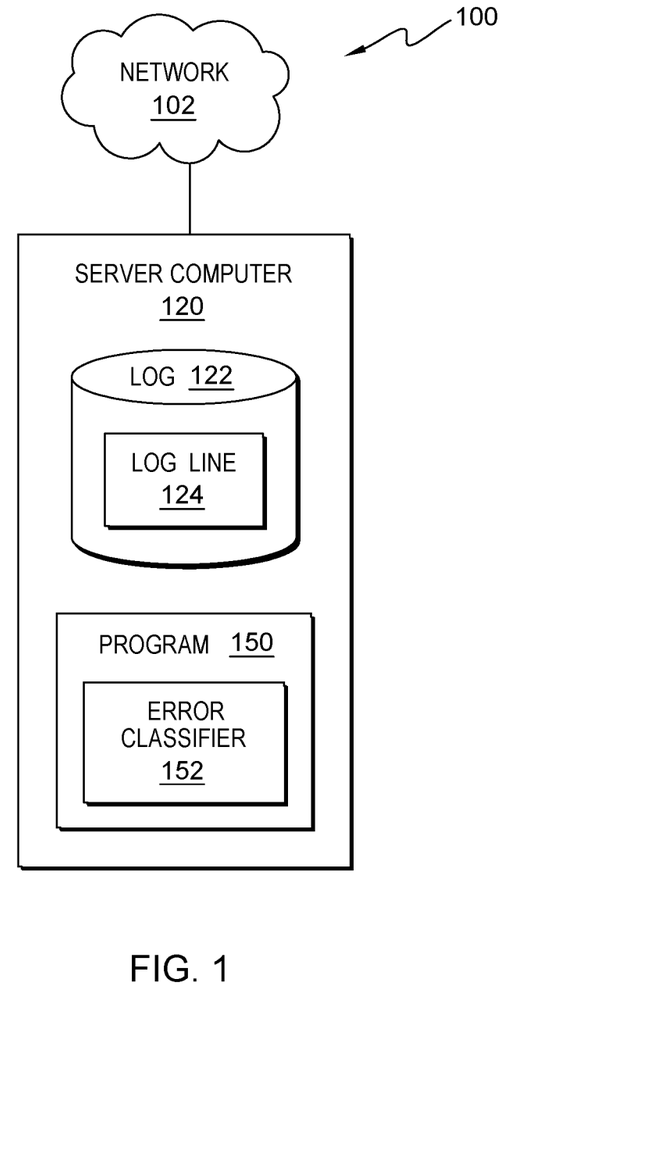

FIG. 1 is a functional block diagram illustrating a computational environment, generally designated 100, in accordance with one embodiment of the present invention. The term "computational" as used in this specification describes a computer system that includes multiple, physically, distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computational environment 100 includes server computer 120 connected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between server computer 120, and other computing devices (not shown) within computational environment 100. In various embodiments, network 102 operates locally via wired, wireless, or optical connections and can be any combination of connections and protocols (e.g., personal area network (PAN), near field communication (NFC), laser, infrared, ultrasonic, etc.).

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any programmable electronic device capable of communicating with other computing devices (not shown) within computational environment 100 via network 102. In another embodiment, server computer 120 represents a computing system utilizing clustered computers and components (e.g., database server computers, application server computers, etc.) that act as a single pool of seamless resources when accessed within computational environment 100. In the depicted embodiment, server computer 120 includes log 122 and program 150. In other embodiments, server computer 120 may contain other applications, databases, programs, etc. which have not been depicted in computational environment 100. Server computer 120 may include internal and external hardware components, as depicted and described in further detail with respect to FIG. 6.

Log 122 is a repository for data used by program 150. In the depicted embodiment, log 122 resides on server computer 120. In another embodiment, log 122 may reside elsewhere within computational environment 100 provided program 150 has access to log 122. A database is an organized collection of data. Log 122 can be implemented with any type of storage device capable of storing data and configuration files that can be accessed and utilized by program 150, such as a database server, a hard disk drive, or a flash memory. In an embodiment, log 122 contains a plurality of log line 124. Log line 124 is an unlabeled data point derived from historical performance and event data, streaming real-time operations events, system logs and metrics, network data (i.e., packet data), incident-related data and ticketing, and related document-based data. In an embodiment, log line (LL) 124 contains an event in a series of events that occurred in a monitored system or component, where each event is associated with a timestamp and a description describing the nature of the event. In a further embodiment, each event includes severity level, thread ID, ID of the originating component, host name, etc.

Program 150 is a program for anomaly detection. In various embodiments, program 150 may implement the following steps: classify each log line in a plurality of unlabeled log lines as an erroneous log line or a non-erroneous log line; templatize each classified erroneous log line and non-erroneous log line in the plurality of unlabeled log lines; cluster erroneous log templates into erroneous log template clusters and the non-erroneous log templates into non-erroneous log template clusters; eliminate the erroneous log template clusters and the non-erroneous log template clusters that exceed a frequency threshold; train a log anomaly model utilizing remaining erroneous log template clusters and remaining non-erroneous log template clusters; and identify a subsequent log line as anomalous or non-anomalous utilizing the trained log anomaly model. In the depicted embodiment, program 150 is a standalone software program. In another embodiment, the functionality of program 150, or any combination programs thereof, may be integrated into a single software program. In some embodiments, program 150 may be located on separate computing devices (not depicted) but can still communicate over network 102. In various embodiments, client versions of program 150 resides on any other computing device (not depicted) within computational environment 100. In the depicted embodiment, program 150 includes error classifier 152. Program 150 is depicted and described in further detail with respect to FIG. 2.

Error classifier 152 is representative of a classifier or model for determining whether a log line 124 is an erroneous log line (ELL) or a non-erroneous log line (NELL). Error classifier 152 utilizes a plurality of clustering techniques for error determination within logs 122. In an embodiment, error classifier 152 utilizes a dictionary or list of symptom-words to identify the erroneous log lines. In another embodiment, error classifier 152 is a NOI classifier that classifies each log line to one of the following categories: "Information", "Unknown", "Latency", "Saturation", "Exception", "State Change", etc. In another embodiment, error classifier 152 utilizes learning techniques to train, calculate weights, ingest inputs, and output a classification. In an embodiment, error classifier 152 is comprised of any combination of deep learning model, technique, and algorithm (e.g., decision trees, Naive Bayes classification, support vector machines for classification problems, random forest for classification and regression, linear regression, least squares regression, logistic regression). In an embodiment, hybrid error classifier 152 utilizes transferrable neural networks algorithms and models (e.g., long short-term memory (LSTM), deep stacking network (DSN), deep belief network (DBN), convolutional neural networks (CNN), compound hierarchical deep models, etc.) that can be trained with supervised or unsupervised methods. The training of error classifier 152 is depicted and described in further detail with respect to FIG. 2.

The present invention may contain various accessible data sources, such as log 122 and log line 124, that may include personal storage devices, data, content, or information the user wishes not to be processed. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Program 150 provides informed consent, with notice of the collection of personal data, allowing the user to opt in or opt out of processing personal data. Consent can take several forms. Opt-in consent can impose on the user to take an affirmative action before the personal data is processed. Alternatively, opt-out consent can impose on the user to take an affirmative action to prevent the processing of personal data before the data is processed. Program 150 enables the authorized and secure processing of user information, such as tracking information, as well as personal data, such as personally identifying information or sensitive personal information. Program 150 provides information regarding the personal data and the nature (e.g., type, scope, purpose, duration, etc.) of the processing. Program 150 provides the user with copies of stored personal data. Program 150 allows the correction or completion of incorrect or incomplete personal data. Program 150 allows the immediate deletion of personal data.

Figure 2:
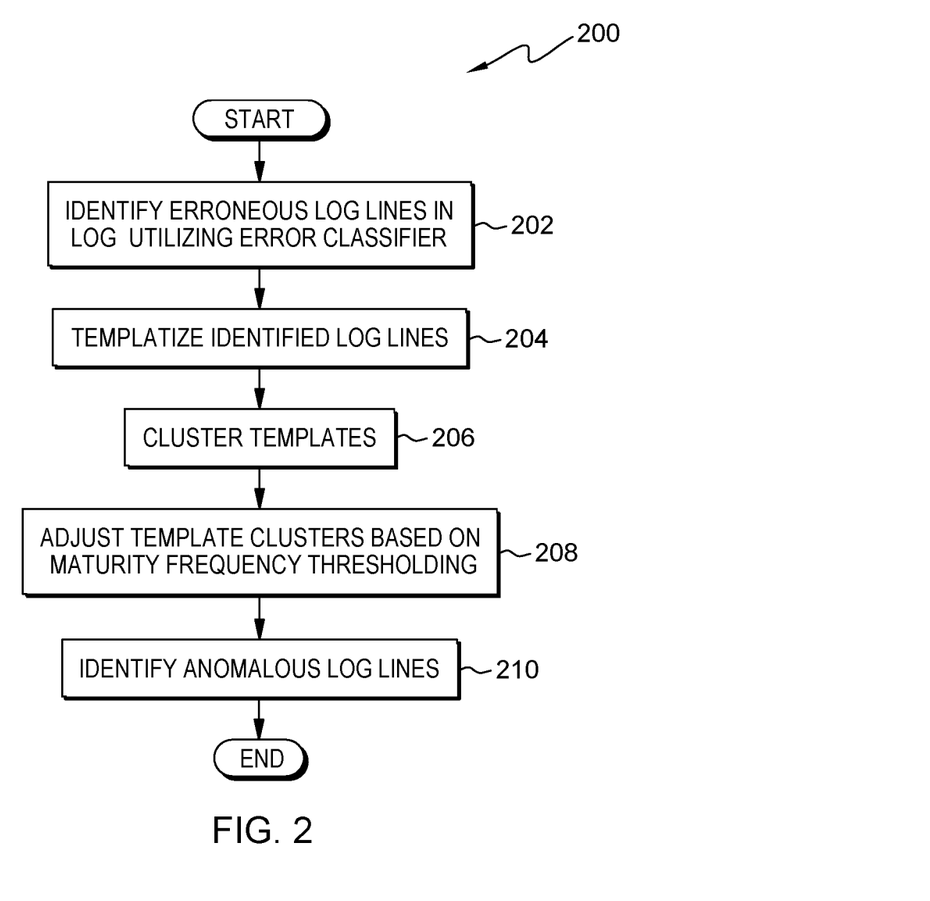
FIG. 2 is a flowchart depicting operational steps of a program, on a server computer within the computational environment of FIG. 1, for log anomaly detection training with unlabeled data, in accordance with an embodiment of the present invention.

FIG. 2 depicts flowchart 200 illustrating operational steps of program 150 for anomaly detection, in accordance with an embodiment of the present invention.

Program 150 identifies erroneous log lines utilizing an error classifier (step 202). In an embodiment, program 150 initiates responsive to a collection of log lines through the initial deploy of a system or data pipeline. Program 150 analyzes log 122 by iteratively identifying log lines as erroneous or non-erroneous utilizing error classifier 152. In an embodiment, error classifier 152 utilizes a dictionary or list of symptom-words to identify erroneous log lines. Program 150 aggregates each identified erroneous and non-erroneous log line into separate log line clusters or log files (e.g., a log file containing only erroneous log lines).

Program 150 templatizes the identified log lines (step 204). Program 150 respectively templatizes the aggregated erroneous and non-erroneous log lines through invariant and parameter log line identification and tokenization. In an embodiment, program 150 initiates with a dictionary (i.e., set) of assumptions (i.e., invariants and parameters) and, over a period of time, converges on a subset assumptions that accurately describes log 122. In this embodiment, program 150 extracts a list of invariants and parameters from initial logs 122 based on an associated frequency distribution. In these embodiment, program 150 preserves identified invariants while tokenizing identified parameters when generating an associated log template. In another embodiment, program 150 utilizes a template miner, such as AQL-rules, to create a plurality of log templates from the identified erroneous and non-erroneous log lines. In an embodiment, program 150 utilizes the template miner to extract patterns from log 122 with the following steps: cleaning log lines; checking for matching log templates using a fixed depth tree; responsive to one or more matched log templates, identifying a similar log within the one or more matched log templates; and responsive to no matched log templates, creating a new log template. Step 204 results in two sets of separated, templatized erroneous and non-erroneous log lines.

Program 150 clusters templatized log lines (step 206). Program 150 clusters each log template or templatized log lines into one or more erroneous log template clusters (ELTCs) or non-erroneous log template clusters (non-ELTC). In an embodiment, program 150 utilizes fuzzy clustering techniques to cluster the log templates. In this embodiment, program 150 computes a lexical similarity between a log template and an existing log template cluster, where the lexical similarity is calculated from an aggregated value of all templates within the existing log template cluster. In another embodiment, program 150 utilizes curriculum clustering to cluster the templates. In yet another embodiment, program 150 utilizes hierarchical clustering without embedding. In this embodiment, program 150 first extracts entity, action and symptom words from log templates; then program 150 prepares a sequence of words for the log templates using the extracted words while preserving word order; lastly program 150 computes a jaro distance between sentences while using the jaro distance to perform the hierarchical clustering. In an embodiment, program 150 checks if a template is substantially similar (e.g., exceeds a jaro distance threshold or lexical similarity) to any of the existing template clusters. Responsive to a similar template, program 150 updates the frequency distribution and counts of the template and associated template clusters, thus keeping the existing template clusters updated.

Program 150 adjusts template clusters based on maturity frequency thresholding (step 208). Responsive to one or more templates clusters, program 150 calculates a frequency distribution comprising the distributions for each template cluster. In an embodiment, program 150 removes highly frequent (e.g., template clusters containing more than 40% of the templates, exceed frequency threshold, etc.) template clusters while maintaining the remaining template clusters. Responsive to the cluster reduction, program 150 calculates another frequency distribution with the remaining template clusters. With this frequency distribution, program 150 computes a frequency threshold for the template clusters, where the frequency threshold is an exponentially increasing function that is updated based on the maturity (i.e., as the system ages, the threshold is increased) of a monitored system or component. In an embodiment, program 150 initially sets the frequency threshold to the median, but any point between the first and third quartile of the frequency distribution is suitable. In this embodiment, program 150 sets the rate of increase for the frequency threshold based on dataset considerations, precision or recall system requirements. In an embodiment, program 150 identifies any log template cluster, and all included log lines, with a frequency count less than the frequency threshold (e.g., median or $3^{rd}$ quartile) as anomalous.

Program 150 identifies anomalous log lines (step 210). In an embodiment, program 150 incrementally updates error classifier 152 and trains a log anomaly model with the frequency threshold reduced log template clusters to identify anomalous non-erroneous log lines, anomalous non-erroneous clusters, anomalous erroneous log lines, and anomalous erroneous log clusters. Responsive to a subsequent log line matching into an anomalous erroneous or non-erroneous template cluster, program 150 identifies the subsequent log line as anomalous. Responsive to the subsequent log line (i.e., erroneous log line) absent (i.e., failing to exceed a lexical similarity threshold) from the erroneous log template clusters, program 150 identifies the subsequent log line as an anomaly, templatizes the subsequent log line, creates a new erroneous log template cluster with the templatized subsequent log line, and sets the frequency count of the new erroneous log template cluster to 1. Any future occurrence of similar log lines (i.e., within the new erroneous log template cluster) are classified as anomalous until a frequency threshold (e.g., $3^{rd}$ quartile) is reached or exceeded. Responsive to the subsequent log line (i.e., non-erroneous log line) absent from the non-erroneous log template clusters, program 150 identifies the subsequent log line as a non-anomaly, templatizes the subsequent log line, creates a new non-erroneous log template cluster with the templatized subsequent log line, and sets the frequency count of the new non-erroneous log template cluster to 1. Any future occurrence of similar log lines (i.e., within the new non-erroneous log template cluster) are classified as non-anomalous until a frequency threshold (e.g., $1^{st}$ quartile) and a timestamp threshold (i.e., abs[log line timestamp—threshold]) are reached or exceeded. In an embodiment, program 150 correlates anomalous events (i.e., log lines) with other events across environments (e.g., system, logs, versions, locations, etc.) to identify the cause of the anomalous event (e.g., outage, performance variation, or computational disparity) and suggest or implement remedies. For example, program 150 adjusts computational resources to a monitored system continuing to output anomalous log lines. In this embodiment, program 150 presents suggestions or remedies to a user.

FIGS. 3A-D are tables depicting benchmarks of the present invention in accordance with an embodiment of the present invention.

Figure 3A:
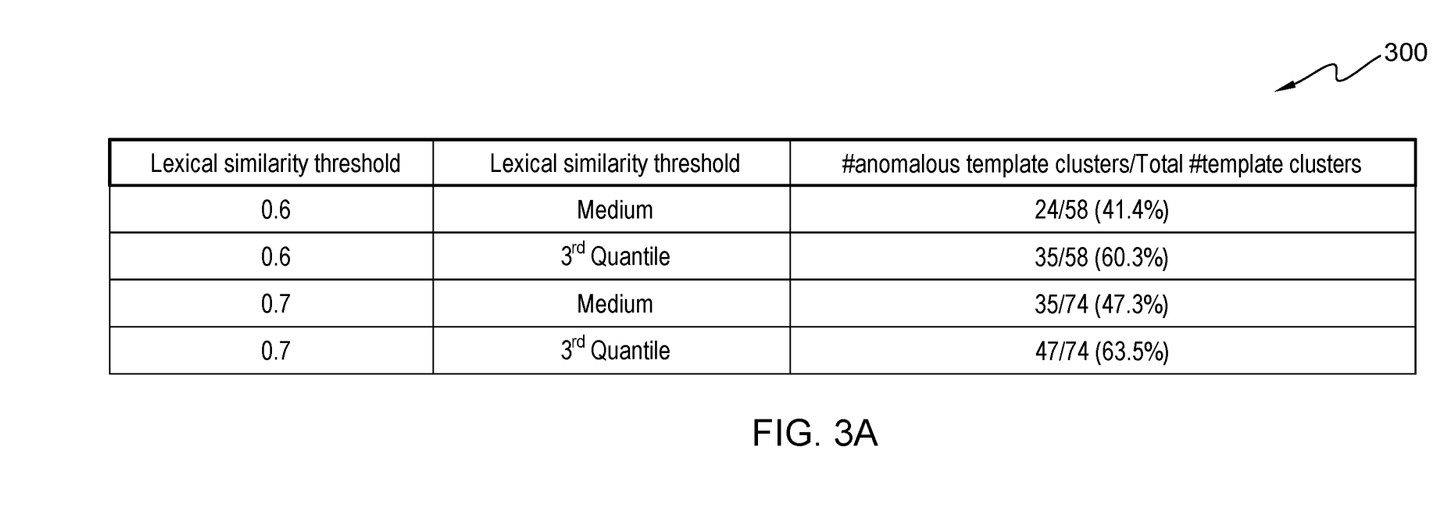
FIGS. 3A-D are tables depicting benchmarks of the present invention, in accordance with an embodiment of the present invention.

FIG. 3A depicts table 300 describing training dataset statistics utilized for the experimental scenarios detailed below. Table 300 details 4 experimental scenarios including a lexical similarity threshold (i.e., [0.6, 0.7]) paired with a frequency threshold (i.e., [median, $3^{rd}$ quartile]) and detected anomalous template clusters. In this embodiment, program 150 trained with training data comprising 700,000 system logs collected over the span of 6 months.

Figure 3B:
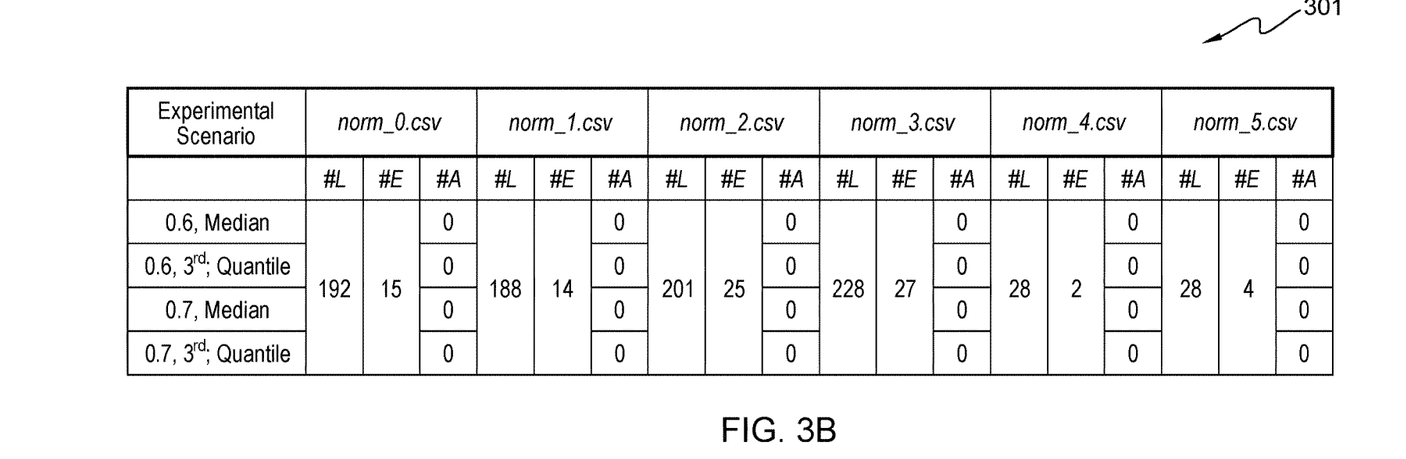

FIG. 3B depicts table 301 detailing results from the 4 experimental scenarios described in FIG. 3A. Table 301 includes the results from a test set of 6 logs corresponding to a non-incident (i.e., non-erroneous, norm log) fed into program 150. Table 301 includes details for the number of log lines (#L), erroneous log lines (#E), and anomalous log lines (#A). Here, program 150 did not detect any anomalies under the 4 experimental scenarios. Table 301 demonstrates that program 150 identified a significant number of erroneous log lines among the logs, while appropriately identifying no anomalies within the number of erroneous log lines.

Figure 3C:
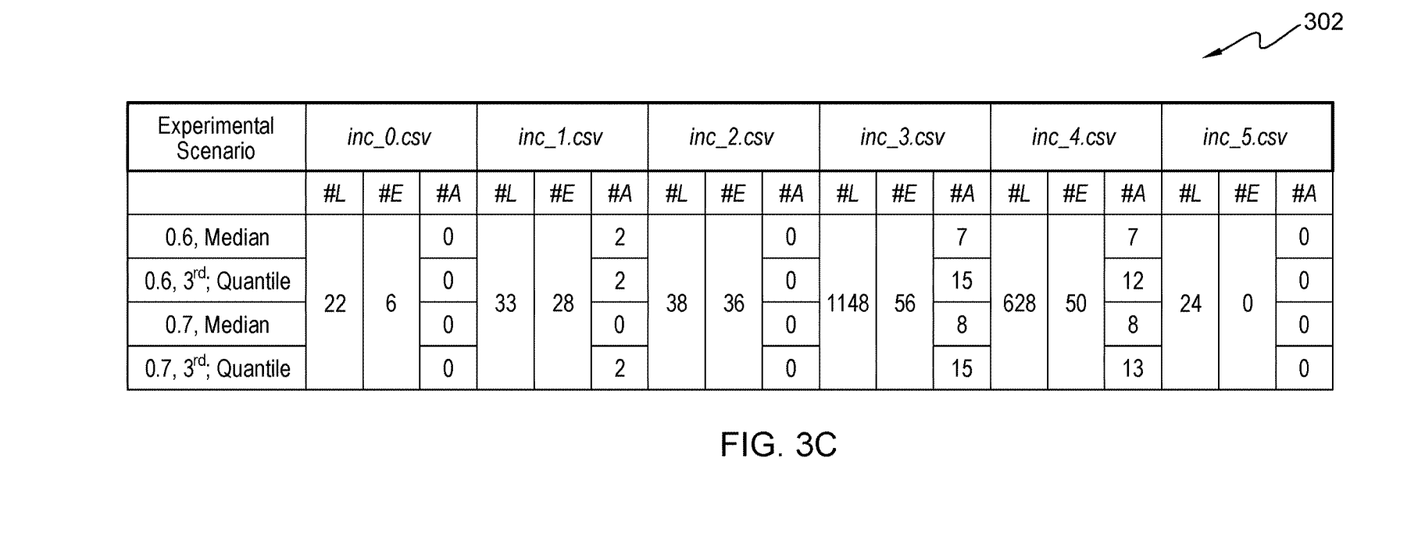

FIG. 3C depicts table 302 continuing from table 301, describing the results from a test set of 6 log files corresponding to an incident (i.e., erroneous, inc. log file) fed into program 150. Here, program 150 detected anomalous log lines within 3 logs, such as 15 anomalies utilizing a 0.7 lexical similarity threshold and a $3^{rd}$ quartile frequency threshold. Table 301 demonstrates that program 150 correctly identified 6 erroneous lines among 22 total log lines in inc_0.csv but the 6 erroneous log lines never occurred among the log template clusters at training thus the 6 erroneous log lines were not detected as anomalies; 36 erroneous lines among 38 total log lines in inc_2.csv; 0 erroneous lines among 24 total log lines in inc_5.csv. Program 150 correctly identified all anomalies within inc_3.csv and inc_4.csv due to the significant number of log lines collected for training.

Figure 3D:
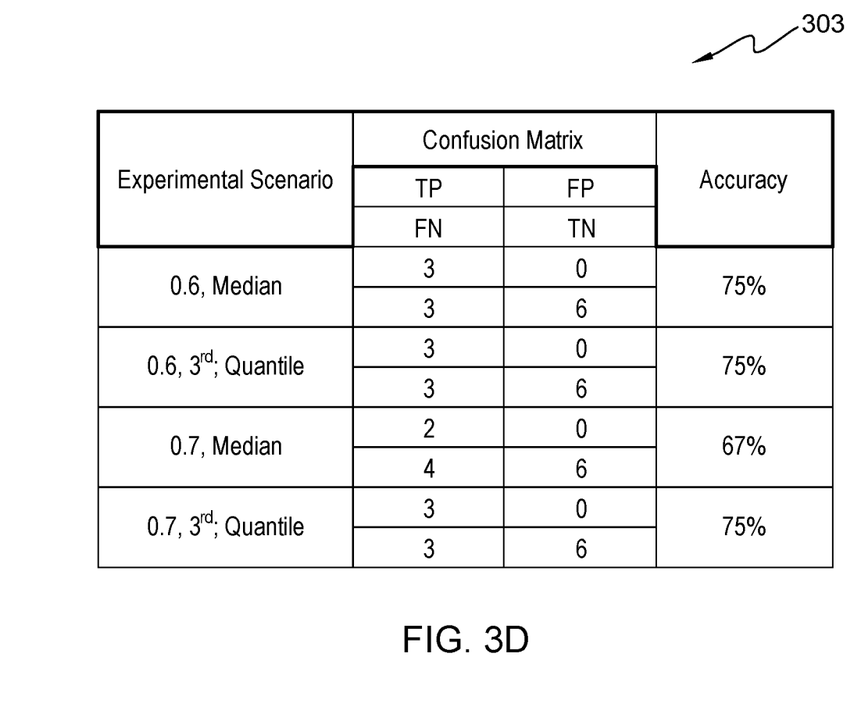

FIG. 3D depicts table 303 detailing the results from tables 301 and 302. Table 303 includes the 4 experimental scenarios, each with an associated confusion matrix and accuracy value, where the confusion matrix comprises values for true positive (TN), false positive (FP), false negatives (FN), and true negatives (TN). Program 150 had equal accuracies for 3 experimental scenarios [(0.6, median), (0.6, $3^{rd}$ quartile) and (0.7, $3^{rd}$ quartile)], with (0.7, $3^{rd}$ quartile) being the most optimal due to the higher lexical similarity threshold forming more accurate template clusters. Greater accuracy can be obtained by utilizing fuzzy template matching and responsive to an encountered log line that is absent from training data, program 150 classifying the log line as anomalous.

Figure 4A:
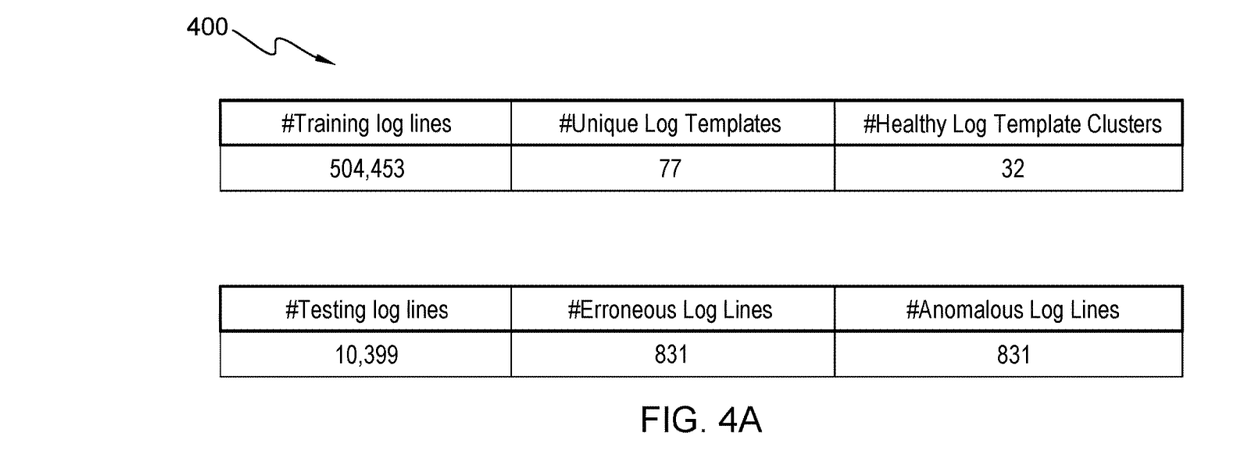
FIGS. 4A-B are tables depicting benchmarks of the present invention, in accordance with an embodiment of the present invention.
Figure 4B:
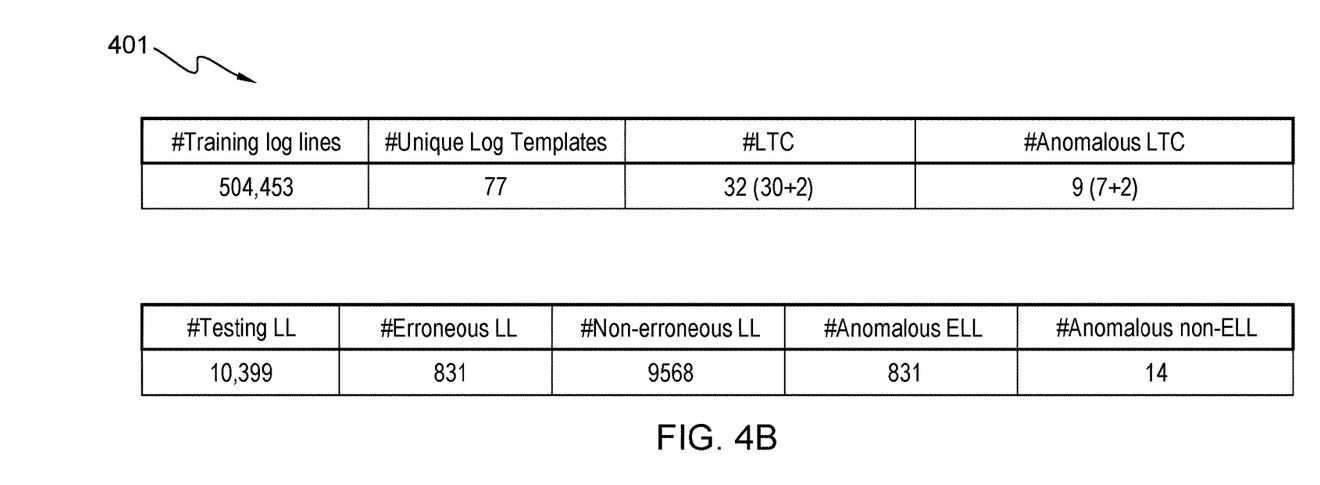

FIGS. 4A-B are tables depicting benchmarks of the present invention in accordance with an embodiment of the present invention.

FIG. 4A depicts table 400 describing training dataset statistics utilized to train program 150 in an experimental scenario. Table 400 details training data with 504,453 log lines collected over 3 days and testing data with 10,399 log lines over 15 minutes. Here, program 150 identified 813 erroneous log lines with each erroneous log line identified as anomalous.

FIG. 4B depicts table 401 describing training dataset statistics utilized to train program 150 in an experimental scenario. Table 401 details training data with 504,453 log lines collected over 3 days with 592 erroneous log lines corresponding to 2 erroneous log template clusters (ELTCs) and utilizing frequency thresholding, corresponding to the anomalous log template clusters (LTCs). Table 401 includes testing data with 10,399 log lines over 15 minutes, where none of the erroneous log lines at testing matched with any of the anomalous LTC.

Figure 5A:
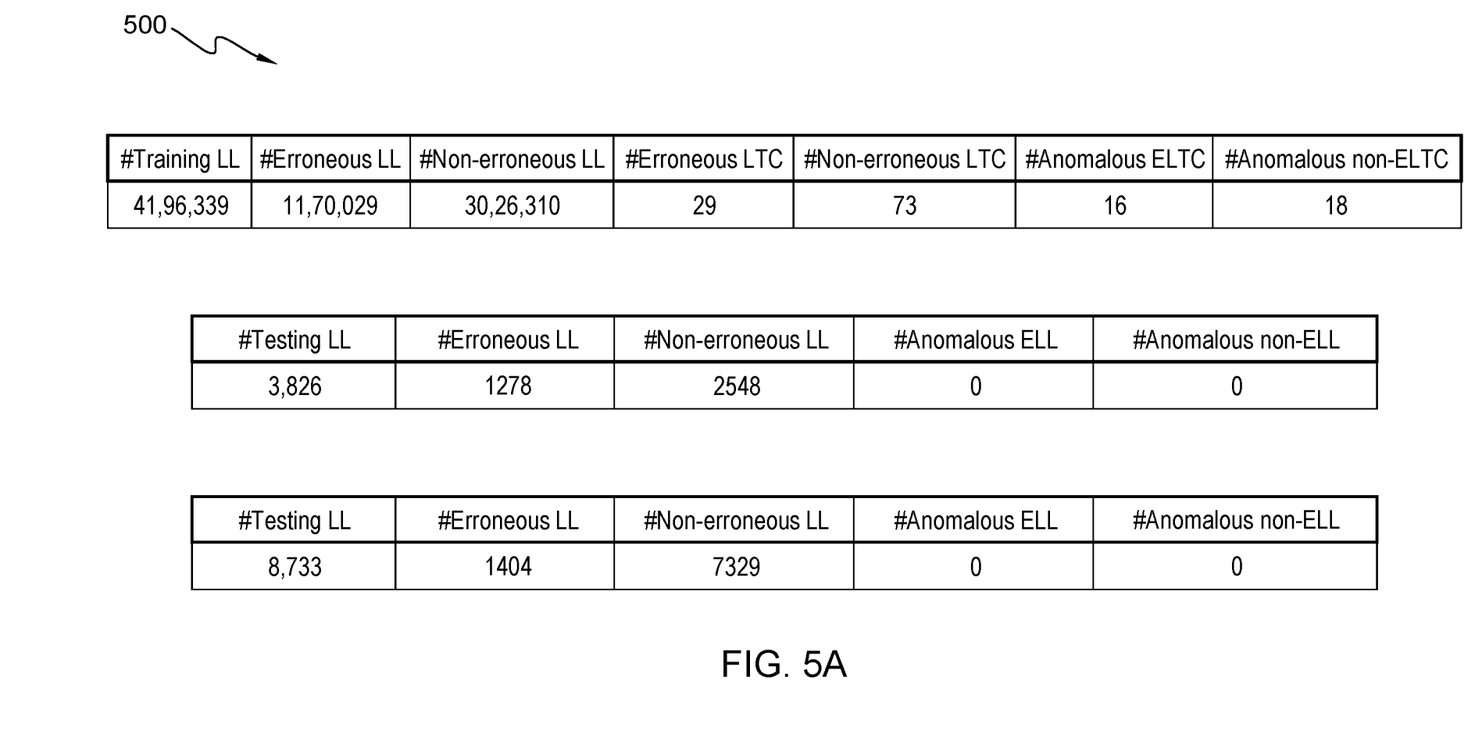
FIGS. 5A-B are tables depicting benchmarks of the present invention, in accordance with an embodiment of the present invention.
Figure 5B:
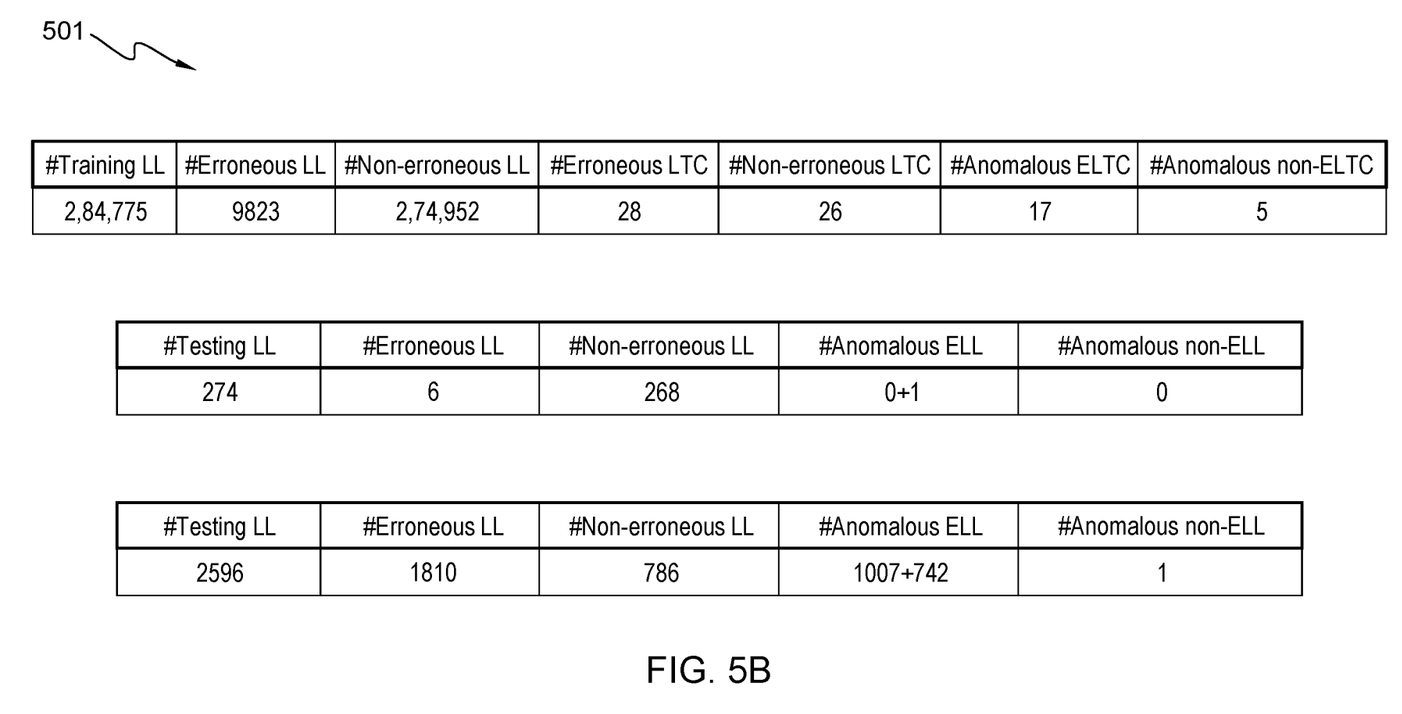

FIGS. 5A-B are tables depicting benchmarks of the present invention in accordance with an embodiment of the present invention.

FIG. 5A depicts table 500 describing training dataset statistics utilized to train program 150 in an experimental scenario. Table 500 details training data with 4,196,339 log lines collected over several weeks with 1,170,029 error log lines corresponding to 29 ELTC and 16 anomalous LTCs. Table 500 also details two sets of testing data respectively with 3826 and 8733 log lines. Here in one set, program 150 identified 1278 error log lines with 0 erroneous log lines being anomalous. In the other set, program identified 1404 erroneous log lines with 0 erroneous log lines being anomalous.

FIG. 5B depicts table 501 describing training dataset statistics utilized to train program 150 in an experimental scenario. Table 501 details training data with 284,775 log lines collected over several weeks with 9823 erroneous log lines corresponding to 28 ELTC and 17 anomalous LTCs. Table 501 also details two sets of testing data respectively with 274 and 2596 log lines. Here in one set, program 150 identified 6 erroneous log lines with 1 erroneous log line being anomalous. In the other set, program identified 1810 erroneous log lines with 1749 erroneous log lines being anomalous.

Figure 6:
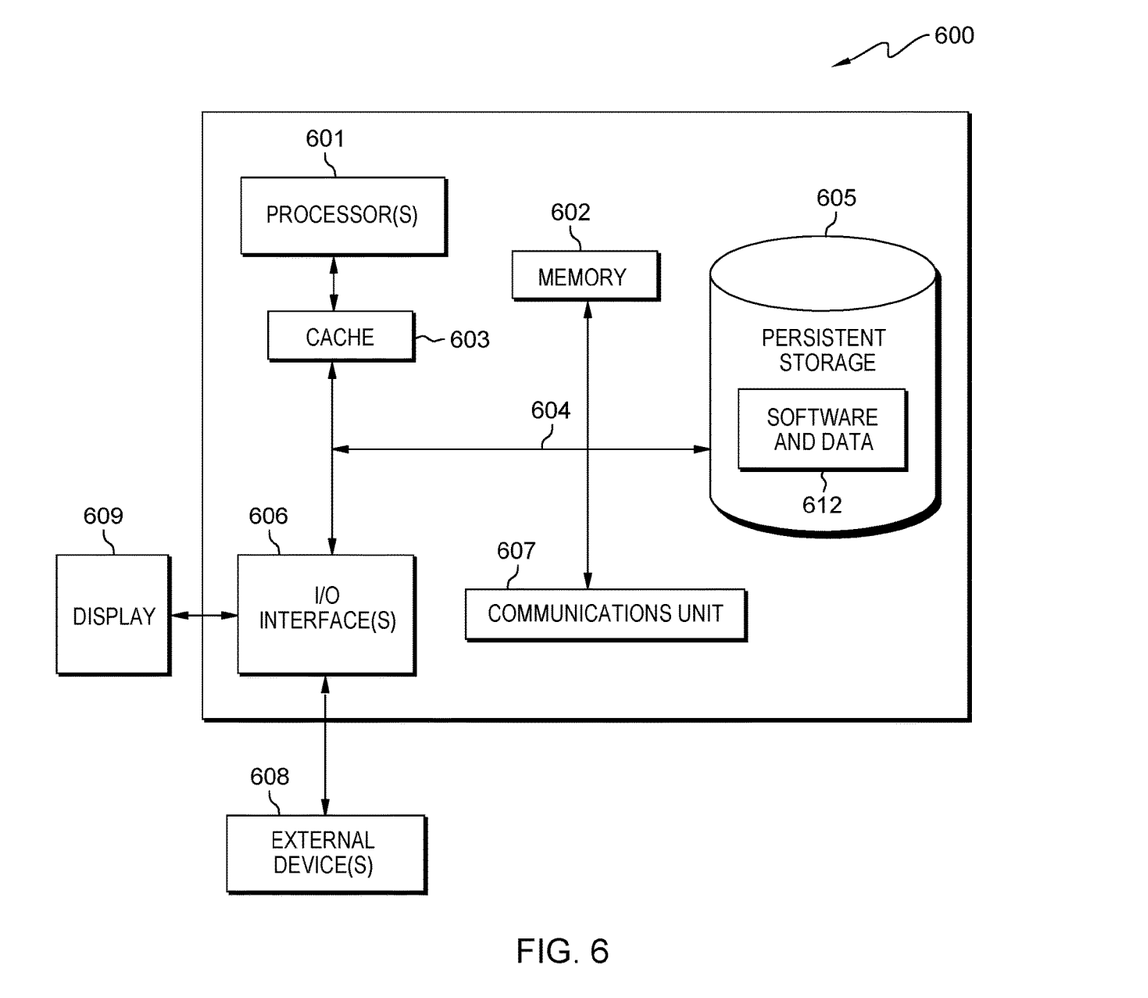
FIG. 6 is a block diagram of components of the server computer, in accordance with an embodiment of the present invention.

FIG. 6 depicts block diagram 600 illustrating components of server computer 120 in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Server computer 120 each include communications fabric 604, which provides communications between cache 603, memory 602, persistent storage 605, communications unit 607, and input/output (I/O) interface(s) 606. Communications fabric 604 can be implemented with any architecture designed for passing data and/or control information between processors (such as microprocessors, communications, and network processors, etc.), system memory, peripheral devices, and any other hardware components within a system. For example, communications fabric 604 can be implemented with one or more buses or a crossbar switch.

Memory 602 and persistent storage 605 are computer readable storage media. In this embodiment, memory 602 includes random access memory (RAM). In general, memory 602 can include any suitable volatile or non-volatile computer readable storage media. Cache 603 is a fast memory that enhances the performance of computer processor(s) 601 by holding recently accessed data, and data near accessed data, from memory 602.

Program 150 may be stored in persistent storage 605 and in memory 602 for execution by one or more of the respective computer processor(s) 601 via cache 603. In an embodiment, persistent storage 605 includes a magnetic hard disk drive. Alternatively, or in addition to a magnetic hard disk drive, persistent storage 605 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 605 may also be removable. For example, a removable hard drive may be used for persistent storage 605. Other examples include optical and magnetic disks, thumb drives, and smart cards that are inserted into a drive for transfer onto another computer readable storage medium that is also part of persistent storage 605. Software and data 612 can be stored in persistent storage 605 for access and/or execution by one or more of the respective processors 601 via cache 603.

Communications unit 607, in these examples, provides for communications with other data processing systems or devices. In these examples, communications unit 607 includes one or more network interface cards. Communications unit 607 may provide communications through the use of either or both physical and wireless communications links. Program 150 may be downloaded to persistent storage 605 through communications unit 607.

I/O interface(s) 606 allows for input and output of data with other devices that may be connected to server computer 120. For example, I/O interface(s) 606 may provide a connection to external device(s) 608, such as a keyboard, a keypad, a touch screen, and/or some other suitable input device. External devices 608 can also include portable computer readable storage media such as, for example, thumb drives, portable optical or magnetic disks, and memory cards. Software and data used to practice embodiments of the present invention, e.g., program 150, can be stored on such portable computer readable storage media and can be loaded onto persistent storage 605 via I/O interface(s) 606. I/O interface(s) 606 also connect to a display 609.

Display 609 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, conventional procedural programming languages, such as the "C" programming language or similar programming languages, and quantum programming languages such as the "Q" programming language, Q#, quantum computation language (QCL) or similar programming languages, low-level programming languages, such as the assembly language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    classifying, by one or more computer processors, each log line in a plurality of unlabeled log lines as an erroneous log line or a non-erroneous log line;
    templatizing, by one or more computer processors, each classified erroneous log line and non-erroneous log line in the plurality of unlabeled log lines;
    clustering, by one or more computer processors, erroneous log line templates into one or more erroneous log line template clusters and non-erroneous log line templates into one or more non-erroneous log template clusters, wherein clustering comprises:
        computing, by one or more computer processors, a respective lexical similarity between each templatized erroneous log line and a clustered erroneous log line template, wherein the lexical similarity is calculated from an aggregated value of templatized log lines within the erroneous log line template clusters; and
        computing, by one or more computer processors, a respective second lexical similarity between each templatized non-erroneous log line and a clustered non-erroneous log line template, wherein the second lexical similarity is calculated from an aggregated value of templatized log lines within the non-erroneous log line template clusters;
    eliminating, by one or more computer processors, the one or more erroneous log line template clusters and the one or more non-erroneous log template clusters that exceed a frequency threshold;
    training, by one or more computer processors, a log line anomaly model utilizing remaining erroneous log line template clusters and remaining non-erroneous log line template clusters; and
    identifying, by one or more computer processors, a subsequent log line as anomalous or non-anomalous utilizing the trained log line anomaly model.

2. The computer-implemented method of claim 1, wherein identifying the subsequent log line as anomalous or non-anomalous utilizing the trained log line anomaly model, comprises:
    templatizing, by one or more computer processors, the subsequent log line; and
    matching, by one or more computer processors, the templatized subsequent log line into an existing erroneous log line template cluster or an existing non-erroneous log line template cluster.

3. The computer-implemented method of claim 2, further comprising:
    responsive to the subsequent log line failing to match into one or more erroneous log line template clusters, classifying, by one or more computer processors, the subsequent log line as anomalous;

creating, by one or more computer processors, a new erroneous log line template cluster with the subsequent log line;

setting, by one or more computer processors, a frequency of the created erroneous log line template cluster to one; and classifying, by one or more computer processors, an occurrence of similar log lines as anomalous until the frequency threshold is reached or exceeded.

4. The computer-implemented method of claim 3, further comprising:

implementing, by one or more computer processors, a remedy to the classified anomalous subsequent log line.

5. The computer-implemented method of claim 2, further comprising:

responsive to the subsequent log line failing to match into one or more non-erroneous log line template clusters, classifying, by one or more computer processors, the subsequent log line as non-anomalous;

creating, by one or more computer processors, a new erroneous log line template cluster with the subsequent log line;

setting, by one or more computer processors, a frequency of the created erroneous log line template cluster to one; and classifying, by one or more computer processors, an occurrence of similar log lines as non-anomalous until the frequency threshold and a timestamp threshold is reached or exceeded.

6. The computer-implemented method of claim 1, wherein the frequency threshold is an exponentially increasing function updated based on a maturity of a monitored system.

7. The computer-implemented method of claim 6, further comprising:

setting, by one or more computer processors, a rate of increase for the frequency threshold based on dataset considerations, precision or recall system requirements.

8. A computer program product comprising:

one or more computer readable storage media and program instructions stored on the one or more computer readable storage media, the stored program instructions comprising:

program instructions to classify each log line in a plurality of unlabeled log lines as an erroneous log line or a non-erroneous log line;

program instructions to templatize each classified erroneous log line and non-erroneous log line in the plurality of unlabeled log lines;

program instructions to cluster erroneous log line templates into one or more erroneous log line template clusters and non-erroneous log line templates into one or more non-erroneous log template clusters, wherein the program instruction to cluster comprise:

program instructions to compute a respective lexical similarity between each templatized erroneous log line and a clustered erroneous log line template, wherein the lexical similarity is calculated from an aggregated value of templatized log lines within the erroneous log line template clusters; and program instructions to compute a respective second lexical similarity between each templatized non-erroneous log line and a clustered non-erroneous log line template, wherein the second lexical similarity is calculated from an aggregated value of templatized log lines within the non-erroneous log line template clusters;

program instructions to eliminate the one or more erroneous log line template clusters and the one or more non-erroneous log template clusters that exceed a frequency threshold;

program instructions to train a log line anomaly model utilizing remaining erroneous log line template clusters and remaining non-erroneous log line template clusters; and program instructions to identify a subsequent log line as anomalous or non-anomalous utilizing the trained log line anomaly model.

9. The computer program product of claim 8, wherein the program instructions, to identify the subsequent log line as anomalous or non-anomalous utilizing the trained log line anomaly model, comprise:

program instructions to templatize the subsequent log line; and program instructions to match the templatized subsequent log line into an existing erroneous log line template cluster or an existing non-erroneous log line template cluster.

10. The computer program product of claim 9, wherein the program instructions, stored on the one or more computer readable storage media, further comprise:

program instructions to, responsive to the subsequent log line failing to match into one or more erroneous log line template clusters, classify the subsequent log line as anomalous;

program instructions to create a new erroneous log line template cluster with the subsequent log line;

program instructions to set a frequency of the created erroneous log line template cluster to one; and program instructions to classify an occurrence of similar log lines as anomalous until the frequency threshold is reached or exceeded.

11. The computer program product of claim 10, wherein the program instructions, stored on the one or more computer readable storage media, further comprise:

program instructions to implement a remedy to the classified anomalous subsequent log line.

12. The computer program product of claim 9, wherein the program instructions, stored on the one or more computer readable storage media, further comprise:

program instructions to, responsive to the subsequent log line failing to match into one or more non-erroneous log line template clusters, classify the subsequent log line as non-anomalous;

program instructions to create a new erroneous log line template cluster with the subsequent log line;

program instructions to set a frequency of the created erroneous log line template cluster to one; and program instructions to classify an occurrence of similar log lines as non-anomalous until the frequency threshold and a timestamp threshold is reached or exceeded.

13. The computer program product of claim 8, wherein the frequency threshold is an exponentially increasing function updated based on a maturity of a monitored system.

14. The computer program product of claim 8, wherein the program instructions, stored on the one or more computer readable storage media, further comprise:

program instructions to set a rate of increase for the frequency threshold based on dataset considerations, precision or recall system requirements.

15. A computer system comprising:

one or more computer processors;

one or more computer readable storage media; and program instructions stored on the computer readable storage media for execution by at least one of the one or more processors, the stored program instructions comprising:
- program instructions to classify each log line in a plurality of unlabeled log lines as an erroneous log line or a non-erroneous log line;
- program instructions to templatize each classified erroneous log line and non-erroneous log line in the plurality of unlabeled log lines;
- program instructions to cluster erroneous log line templates into one or more erroneous log line template clusters and non-erroneous log line templates into one or more non-erroneous log template clusters, wherein the program instruction to cluster comprise:
  - program instructions to compute a respective lexical similarity between each templatized erroneous log line and a clustered erroneous log line template, wherein the lexical similarity is calculated from an aggregated value of templatized log lines within the erroneous log line template clusters; and
  - program instructions to compute a respective second lexical similarity between each templatized non-erroneous log line and a clustered non-erroneous log line template, wherein the second lexical similarity is calculated from an aggregated value of templatized log lines within the non-erroneous log line template clusters;
- program instructions to eliminate the one or more erroneous log line template clusters and the one or more non-erroneous log template clusters that exceed a frequency threshold;
- program instructions to train a log line anomaly model utilizing remaining erroneous log line template clusters and remaining non-erroneous log line template clusters; and
- program instructions to identify a subsequent log line as anomalous or non-anomalous utilizing the trained log line anomaly model.

16. The computer system of claim 15, wherein the program instructions, to identify the subsequent log line as anomalous or non-anomalous utilizing the trained log anomaly model, comprise:
- program instructions to templatize the subsequent log line; and
- program instructions to match the templatized subsequent log line into an existing erroneous log line template cluster or an existing non-erroneous log template cluster.

17. The computer system of claim 16, wherein the program instructions, stored on the one or more computer readable storage media, further comprise:
- program instructions to, responsive to the subsequent log line failing to match into one or more erroneous log line template clusters, classify the subsequent log line as anomalous;
- program instructions to create a new erroneous log line template cluster with the subsequent log line;
- program instructions to set a frequency of the created erroneous log line template cluster to one; and
- program instructions to classify an occurrence of similar log lines as anomalous until the frequency threshold is reached or exceeded.

18. The computer system of claim 17, wherein the program instructions, stored on the one or more computer readable storage media, further comprise:
- program instructions to implement a remedy to the classified anomalous subsequent log line.

19. The computer system of claim 16, wherein the program instructions, stored on the one or more computer readable storage media, further comprise:
- program instructions to, responsive to the subsequent log line failing to match into one or more non-erroneous log line template clusters, classify the subsequent log line as non-anomalous;
- program instructions to create a new erroneous log line template cluster with the subsequent log line;
- program instructions to set a frequency of the created erroneous log line template cluster to one; and
- program instructions to classify an occurrence of similar log lines as non-anomalous until the frequency threshold and a timestamp threshold is reached or exceeded.

20. The computer system of claim 15, wherein the frequency threshold is an exponentially increasing function updated based on a maturity of a monitored system.

* * * * *